United States Patent
Mizuno et al.

(10) Patent No.: US 10,957,908 B2
(45) Date of Patent: Mar. 23, 2021

(54) ELECTRODE FOR LITHIUM ION BATTERY, LITHIUM ION BATTERY, AND METHOD FOR PRODUCING ELECTRODE FOR LITHIUM ION BATTERY

(71) Applicant: NISSAN MOTOR CO., LTD., Yokohama (JP)

(72) Inventors: Yusuke Mizuno, Kanagawa (JP); Yasuhiro Shindo, Kanagawa (JP); Yusuke Nakashima, Kanagawa (JP); Kenichi Kawakita, Kanagawa (JP); Yuki Kusachi, Kanagawa (JP); Yasuhiko Ohsawa, Kanagawa (JP); Hajime Satou, Kanagawa (JP); Hiroshi Akama, Kanagawa (JP); Hideaki Horie, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 121 days.

(21) Appl. No.: 15/561,563

(22) PCT Filed: Mar. 3, 2016

(86) PCT No.: PCT/JP2016/056568
§ 371 (c)(1),
(2) Date: Sep. 26, 2017

(87) PCT Pub. No.: WO2016/158187
PCT Pub. Date: Oct. 6, 2016

(65) Prior Publication Data
US 2018/0090762 A1   Mar. 29, 2018

(30) Foreign Application Priority Data
Mar. 27, 2015 (JP) .............................. JP2015-066633

(51) Int. Cl.
*H01M 4/62* (2006.01)
*H01M 4/04* (2006.01)
(Continued)

(52) U.S. Cl.
CPC ........... *H01M 4/62* (2013.01); *H01M 4/0404* (2013.01); *H01M 4/13* (2013.01); *H01M 4/139* (2013.01);
(Continued)

(58) Field of Classification Search
CPC ............ H01M 4/62; H01M 4/36; H01M 4/04; H01M 4/139; H01M 10/0525
See application file for complete search history.

(56) References Cited

U.S. PATENT DOCUMENTS

2006/0035149 A1* 2/2006 Nanba ................ H01M 4/0471
429/218.1
2011/0059361 A1* 3/2011 Wilkening ............ H01M 4/364
429/218.1
(Continued)

FOREIGN PATENT DOCUMENTS

| JP | 9-204936 A | 8/1997 |
| JP | 2002-373643 A | 12/2002 |

(Continued)

OTHER PUBLICATIONS

Machine Translation of: JP 2013/175322, Yamada et al., Sep. 5, 2013.*

*Primary Examiner* — Kenneth J Douyette
(74) *Attorney, Agent, or Firm* — Foley & Lardner LLP (57) ABSTRACT

The objective of the present invention is to provide an electrode for a lithium ion battery which has excellent electron conductivity even when the thickness of the electrode is increased. The electrode for a lithium ion battery according to the present invention includes a first principal (Continued)

surface located on a separator side of the lithium ion battery, and a second principal surface located on a current collector side, wherein the electrode has a thickness of 50 to 5000 μm, and the electrode includes, between the first principal surface and the second principal surface, short fibers (A) having an average fiber length of 50 nm or more and less than 100 μm, long fibers (B) having an average fiber length of 100 μm or more and 1000 μm or less, and active material particles (C), and the short fibers (A) and the long fibers (B) are electroconductive fibers.

20 Claims, 3 Drawing Sheets

(51) Int. Cl.
  *H01M 4/139* (2010.01)
  *H01M 10/0525* (2010.01)
  *H01M 4/13* (2010.01)
  *H01M 4/36* (2006.01)
  *H01M 4/02* (2006.01)

(52) U.S. Cl.
  CPC ............ *H01M 4/36* (2013.01); *H01M 4/364* (2013.01); *H01M 4/366* (2013.01); *H01M 10/0525* (2013.01); *H01M 2004/021* (2013.01); *H01M 2220/20* (2013.01)

(56) References Cited

U.S. PATENT DOCUMENTS

| | | | |
|---|---|---|---|
| 2012/0074610 | A1* | 3/2012 | Wu .................. C04B 35/63468 264/105 |
| 2012/0171566 | A1 | 7/2012 | Yoshitake et al. |
| 2014/0012283 | A1 | 1/2014 | Yasuda et al. |
| 2015/0162610 | A1 | 6/2015 | Zaghib et al. |
| 2017/0033350 | A1 | 2/2017 | Mizuno et al. |
| 2017/0098822 | A1 | 4/2017 | Yachi et al. |

FOREIGN PATENT DOCUMENTS

| | | |
|---|---|---|
| JP | 2011-086480 A | 4/2011 |
| JP | 2013-098085 A | 5/2013 |
| JP | 2013-175322 A | 9/2013 |
| JP | 2015-519699 A | 7/2015 |
| JP | 2015-173071 A | 10/2015 |
| WO | WO 2015/093411 A1 | 6/2015 |
| WO | WO 2015/137041 A1 | 9/2015 |
| WO | WO 2015/147234 A1 | 10/2015 |

* cited by examiner

ELECTRODE FOR LITHIUM ION BATTERY, LITHIUM ION BATTERY, AND METHOD FOR PRODUCING ELECTRODE FOR LITHIUM ION BATTERY

TECHNICAL FIELD

The present invention relates to an electrode for a lithium ion battery, a lithium ion battery, and a method for producing an electrode for a lithium ion battery.

BACKGROUND ART

Recently, there has been a strong demand to reduce carbon dioxide emissions for environmental protection. The automobile industry expects that the introduction of electric vehicles (EV) or hybrid electric vehicles (HEV) will lead to a reduction in carbon dioxide emissions. Thus, intensive efforts have been made to develop a motor driving secondary battery which holds the key to the practical application of those electric vehicles. As for the secondary battery, attention is drawn to a lithium ion secondary battery which can achieve high energy density and high output density.

In a lithium ion secondary battery, in general, an electrode is formed by applying a positive electrode active material, a negative electrode active material, or the like on each of current collectors for a positive electrode and a negative electrode using a binder. Furthermore, in the case of a bipolar battery, a bipolar electrode is formed by having a positive electrode layer formed by applying a positive electrode active material or the like on one side of a current collector using a binder and a negative electrode layer formed by applying a negative electrode active material or the like on the other side of the current collector using a binder (see Patent Literature 1, for example).

In Patent Literature 1, paste for forming electrodes is applied at a thickness of about 25 μm, but a method of increasing the proportion of the positive electrode material and the negative electrode material in a battery is known as a way to increase the energy density of the battery. Patent Literature 2 discloses a means for increasing energy density of a battery in which the film thickness of the electrode is increased and thereby reducing the relative proportion of the current collector or the separator.

CITATION LIST

Patent Literatures

Patent Literature 1: JP 2011-86480 A
Patent Literature 2: JP 9-204936 A

SUMMARY OF INVENTION

Technical Problem

As described in Patent Literature 2, is believed that increasing the film thickness of an electrode reduces the relative proportion of the current collector or the separator so that it is effective for achieving higher battery capacity.

However, in a bipolar electrode, increasing the electrode thickness causes increased proportion of active materials located far from the current collector. Since active materials themselves do not have high electron conductivity, it is considered that electrons will not smoothly move from such active materials far from the current collector to the current collector. For such reasons, even if the amount of active materials become larger, simply increasing the electrode thickness results in poor electron conductivity and lower proportion of effective active materials that are involved with charge and discharge in entire active materials.

Furthermore, in the case of increasing the electrode thickness, a problem occurs in that, as the ion diffusion resistance is high in electrode voids, the charge and discharge capacity under high current, i.e., rate characteristics are significantly impaired.

Furthermore, from the viewpoint that the active materials themselves do not have high electron conductivity, a method of enhancing the electron conductivity by adding a material with particle shape like acetylene black as a conductive aid has been tried. However, in an electrode with an increased thickness, it is difficult for such conductive aid with particle shape to exert the effect of enhancing the electron conductivity.

Solution to Problem

The present inventors conducted intensive studies to solve the above problems. As a result, they have found that, when an electroconductive path for having electric connection in thickness direction of an electrode is formed by using electroconductive fibers composed of two kinds of fibers, i.e., short fibers and long fibers, and electrons generated from an active material are allowed to flow toward a current collector via the electroconductive path, an electrode having excellent electron conductivity and excellent ion conductivity in voids even when the electrode thickness is increased, high proportion of effective active materials, and improved rate characteristics under high current can be obtained by using in combination the short fibers and long fibers with different fiber length. Accordingly, the inventors arrived at the present invention.

The reason for having the effect of improving an output by using in combination the short fibers and long fibers with different fiber length is believed to be the following.

(1) First, it is believed that voids among active materials tend to have a more straight shape and the diffusion path length of the lithium ions passing through those voids tend to become shorter by using long fibers. As a result, ion diffusion resistance is lowered.

(2) By also using short fibers in combination, a greater number of electroconductive paths can be formed "between active material and active material" and "between active material and long fibers" in which no contact can be made with long fibers alone. As a result, electron resistance is lowered.

As a result of the above (1) and (2), both the ion diffusion resistance and electron resistance are lowered. Accordingly, a large amount of electricity can be drawn even at charge and discharge under high current, so that the rate characteristics are improved.

That is, the present invention provides: an electrode for a lithium ion battery provided with a first principal surface located on a separator side of the lithium ion battery and a second principal surface located on a current collector side, wherein the electrode has a thickness of 50 to 5000 μm, and the electrode includes, between the first principal surface and the second principal surface, short fibers (A) having an average fiber length of 50 nm or more and less than 100 μm, long fibers (B) having an average fiber length of 100 μm or more and 1000 μm or less, and active material particles (C), and the short fibers (A) and the long fibers (B) are electroconductive fibers; a lithium ion battery in which the electrode for a lithium ion battery of the present invention is used as a negative electrode and/or a positive electrode; a method for producing the electrode for a lithium ion battery of the present invention including: step (Q1) of applying a slurry (Y) containing the short fibers (A), the long fibers (B), and the active material particles (C) onto a film (E); and step (Q2) of performing pressurization or depressurization and fixing the active material particles (C), the short fibers (A), and the long fibers (B) onto the film (E); and a method for producing the electrode for a lithium ion battery of the present invention including: step (T1) of applying a slurry (Y) containing the short fibers (A), the long fibers (B), and the active material particles (C) onto a current collector to form a slurry layer onto the current collector; and step (T2) of disposing a separator on the slurry layer and absorbing liquid from an upper surface of the separator so as to fix the active material particles (C), the short fibers (A), and the long fibers (B) between the current collector and the separator.

Effect of Invention

According to the electrode for a lithium ion battery of the present invention, an electroconductive path for having electric connection in thickness direction of an electrode is formed by using electroconductive fibers composed of two kinds of fibers, i.e., short fibers and long fibers between the first principal surface and the second principal surface. As such, electrons generated from an active material can be flown toward a current collector via the electroconductive path. Accordingly, even for a case in which the electrode thickness is as thick as 50 to 5000 μm and the amount of active material is relatively large, electrons generated from an active material far from the current collector can smoothly reach the current collector. For such reasons, an electrode for a lithium ion battery which is excellent in electron conductivity and suitable for having high capacity of a lithium ion battery can be obtained.

DESCRIPTION OF EMBODIMENTS

The present invention will be described in detail below.

The electrode for a lithium ion battery according to the present invention is an electrode for a lithium ion battery provided with a first principal surface located on a separator side of the lithium ion battery and a second principal surface located on a current collector side, wherein
the electrode has a thickness of 50 to 5000 μm,
the electrode includes, between the first principal surface and the second principal surface, short fibers (A) having an average fiber length of 50 nm or more and less than 100 μm, long fibers (B) having an average fiber length of 100 μm or more and 1000 μm or less, and active material particles (C), and
the short fibers (A) and the long fibers (B) are electroconductive fibers.

In the electrode for a lithium ion battery of the present invention, the short fibers (A) having an average fiber length of 50 nm or more and less than 100 μm, the long fibers (B) having an average fiber length of 100 μm or more and 1000 μm or less, and active material particles (C) are included between the first principal surface and the second principal surface.

The short fibers (A) and the long fibers (B) are electroconductive fibers.

Figure 1:
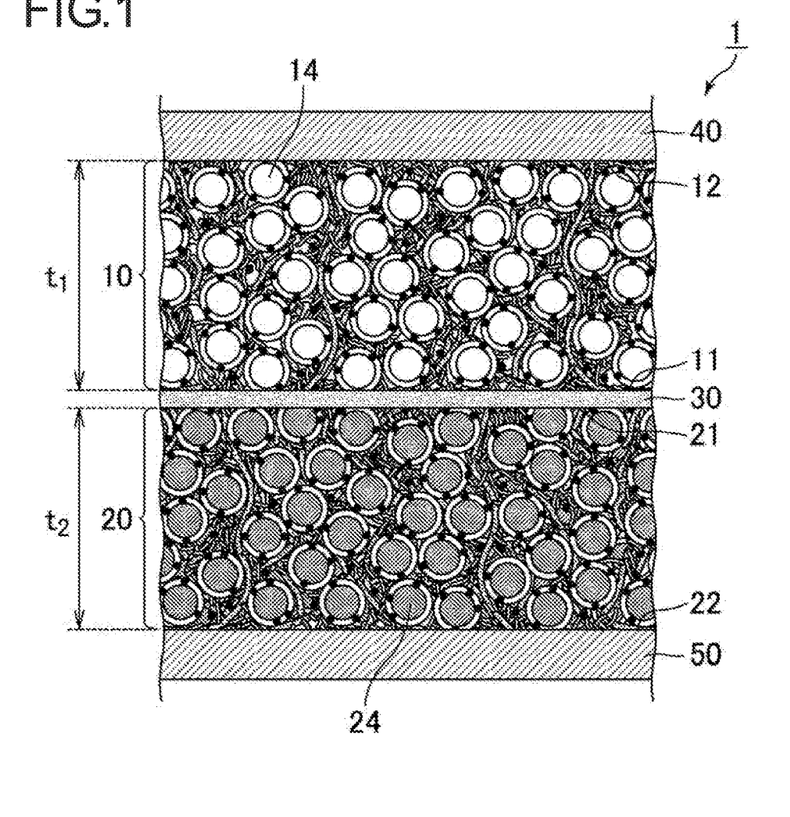
FIG. 1 is a schematic cross-sectional view of an example of a structure of a lithium ion battery having the electrode for a lithium ion battery according to the present invention as a positive electrode and a negative electrode.

FIG. 1 is a schematic cross-sectional view of an example of a structure of a lithium ion battery having the electrode for a lithium ion battery according to the present invention as a positive electrode and a negative electrode.

The lithium ion battery (1) illustrated in FIG. 1 has a positive electrode (10) and a negative electrode (20), and between the positive electrode (10) and the negative electrode (20), a separator (30) is provided.

A current collector (40) is provided on a surface of the positive electrode (10) opposite the separator (30). A current collector (50) is provided on a surface of the negative electrode (20) opposite the separator (30). In summary, a laminate structure is formed in the above structure in the order of the current collector (40)—the positive electrode (10)—the separator (30)—the negative electrode (20)—the current collector (50), and they form the lithium ion battery (1) as a whole.

The electrode for a lithium ion battery of the present invention has a meaning that it includes neither a separator nor a current collector. Both the positive electrode (10) and the negative electrode (20) illustrated in FIG. 1 are the electrode for a lithium ion battery according to the present invention.

The positive electrode (10) is a sheet-form electrode having a specific thickness (t1). The positive electrode (10) has a first principal surface (11) that is located on the separator (30) side and a second principal surface (12) that is located on the current collector (40) side. The positive electrode (10) contains positive electrode active material particles (14).

Similarly to the above, the negative electrode (20) is also a sheet-form electrode having a specific thickness (t2). The negative electrode (20) has a first principal surface (21) that is located on the separator (30) side and a second principal surface (22) that is located on the current collector (50) side. The negative electrode (20) contains negative electrode active material particles (24).

The thickness (t1) of the positive electrode (10) and the thickness (t2) of the negative electrode (20) are each 50 to 5000 μm. With such thick electrodes, a battery can contain a large amount of active materials, which leads to a lithium ion battery with higher capacity.

The thickness (t1) of the positive electrode for a lithium ion battery according to the present invention is preferably 150 to 1500 μm, more preferably 200 to 950 μm, and still more preferably 250 to 900 μm.

The thickness (t2) of the negative electrode for a lithium ion battery according to the present invention is preferably 150 to 1500 μm, more preferably 200 to 950 μm, and still more preferably 250 to 900 μm.

Such a lithium ion battery in which the electrode for a lithium ion battery of the present invention is used as a negative electrode and/or a positive electrode is the lithium ion battery of the present invention.

Next, the electrode for a lithium ion battery of the present invention is described.

Figure 2:
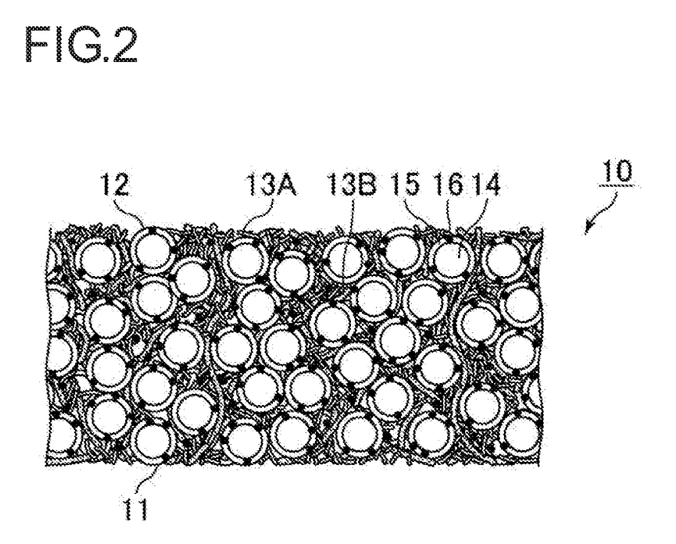
FIG. 2 is a schematic cross-sectional view of only the positive electrode of the lithium ion battery illustrated in FIG. 1.

FIG. 2 is a schematic cross-sectional view of only the positive electrode of the lithium ion battery illustrated in FIG. 1.

The positive electrode (10) has the first principal surface (11) and the second principal surface (12), as mentioned above. In addition, between the first principal surface (11) and the second principal surface (12), the short fibers (A) and the long fibers (B), which are electroconductive fibers, are included. In FIG. 2, the short fibers (A) are expressed with reference symbol 13A and the long fibers (B) are expressed with reference symbol 13B.

Between the first principal surface (11) and the second principal surface (12), the positive electrode active material particles (14) are contained additionally as active material particles (C).

The short fibers (13A) and the long fibers (13B) are electroconductive fibers which are scatteredly present between the first principal surface (11) and the second principal surface (12).

According to the electrode for a lithium ion battery of the present invention, it is preferable that at least part of the short fibers (A) and the long fibers (B) forms an electroconductive path that electrically connects the first principal surface to the second principal surface, and the electroconductive path is in contact with the active material particles (C) around the electroconductive path.

FIG. 2 schematically illustrates a state in which at least part of the short fibers (13A) and the long fibers (13B) forms an electroconductive path that electrically connects the first principal surface (11) to the second principal surface (12).

In FIG. 2, a state in which an electroconductive path is formed according to stacking of a plurality of the long fibers (13B) and the short fibers (13A), which have a shorter length than the electrode thickness, is illustrated.

Furthermore, the short fibers (13A) or the long fibers (13B) that are present on one end of the electroconductive path are extended to the first principal surface (11), and the short fibers (13A) or the long fibers (13B) that are present on the other end of the electroconductive path are extended to the second principal surface (12).

Furthermore, it is also possible that one end of the electroconductive path is connected to the other end of the electroconductive path by one long fiber (13B).

Furthermore, FIG. 2 also illustrates a state in which the electroconductive path formed by the short fibers (13A) and the long fibers (13B) is in contact with the positive electrode active material particles (14) around it.

When the fiber length distribution is measured for the electroconductive fibers that are contained in the electrode for a lithium ion battery of the present invention, at least one peak is present in a region of 50 nm or more and less than 100 μm, and at least one peak is present in a region of 100 μm or more and 1000 μm or less.

In such a case, it can be determined that the short fibers (A) and the long fibers (B) are included in the electrode for a lithium ion battery of the present invention.

Fiber length of the electroconductive fibers can be measured by SEM observation.

First, fiber length is measured for each of the fibers that are present in 0.2 mm square field of view, and by constructing a histogram of the fibers of 50 nm or more and less than 100 μm in which the horizontal axis represents fiber length and the vertical axis represents measurement result (i.e., number of fibers), the fiber length distribution is expressed as a histogram.

Furthermore, the fiber length measurement is carried out for three fields of view, and the histogram is prepared based on total of the three fields of view.

Furthermore, for the fibers that are present in 2 mm square field of view, the fiber length measurement is carried out for three fields of view, and, for the fibers of 100 μm or more and 1000 μm or less, the fiber length distribution is expressed as a histogram similarly to the fibers of 50 nm or more and less than 100 μm.

It is also possible that the measurement results of 0.2 mm square field of view and the measurement results of 2 mm square field of view are taken together and the fiber length distribution is expressed in one histogram. In the case of having an expression in one histogram, it is preferable that conversion is made so as to have suitable scale of the measurement results (i.e., number of fibers).

Furthermore, no counting is made for the fibers which are long and of which one end is outside the field of view so that the fiber length cannot be defined.

Furthermore, among the peaks that are present in a region of 50 nm or more and less than 100 μm, the fiber length with the highest frequency (mode length) is taken as the average fiber length of the short fibers (A), and the fiber length with the highest frequency (mode length) present in a region of 100 μm or more and 1000 μm or less is taken as the average fiber length of the long fibers (B), Furthermore, the fiber length as a horizontal axis for establishing a histogram is described with an interval described below, and the measurement results are also summarized so as to have such an interval.

50 nm to 500 nm: at every 50 nm
500 nm to 1 μm: at every 100 nm
1 μm to 100 μm: at every 10 μm
100 μm to 500 μm: at every 50 μm
500 μm to 1000 μm: at every 100 μm Furthermore, for production of an electrode for a lithium ion battery, if electroconductive fibers of two or more types are used and the type (i.e., product number) and average fiber length of the electroconductive fibers that are used are known, the measurement described above is not carried out. Instead, it is possible to determine the inclusion of the short fibers (A) and the long fibers (B) in view of the value of the average fiber length of the electroconductive fibers that are used.

The short fibers (A) are electroconductive fibers of which average fiber length is 50 nm or more and less than 100 μm, and a preferred range of the average fiber length is 500 nm to 50 μm, and a more preferred range thereof is 5 μm to 30 μm.

The short fibers (A) preferably have an electrical conductivity of 50 mS/cm or more, more preferably 80 mS/cm to 500 kS/cm, and even more preferably 80 to 600 mS/cm. The electrical conductivity of the short fibers (A) can be determined by measuring the volume resistivity in accordance with JIS R 7609 "Carbon fiber—Method for determination of volume resistivity" and calculating the reciprocal of the volume resistivity.

If the short fibers (A) have an electrical conductivity of 50 mS/cm or more, the electroconductive paths that are formed of the short fibers (A) and electrically connect the first principal surface to the second principal surface have small electrical resistance, and smooth transfer of electrons from the active material far from the current collector can be easily achieved, and therefore desirable.

The short fibers (A) preferably have an average fiber diameter of 0.01 to 20 μm, and more preferably 0.05 to 2.0 μm.

The fiber diameter of the short fibers (A) is measured by SEM observation. The average fiber diameter of the short fibers (A) is determined as follows. For ten fibers with fiber length of 50 nm or more and less than 100 μm, which are present in a 0.2 mm square field of view, the diameter at or near the middle of each fiber is measured, and this measurement is performed for three fields of view and the average of the diameters of a total of 30 fibers is taken as the measured value.

The long fibers (B) are electroconductive fibers of which average fiber length is 100 μm or more and 1000 μm or less, and a preferred range of the average fiber length is 110 μm to 600 μm, and a more preferred range thereof is 150 μm to 500 μm.

The long fibers (B) preferably have an electrical conductivity of 50 mS/cm or more, more preferably 80 mS/cm to 500 kS/cm, and even more preferably 80 to 200 mS/cm. The electrical conductivity of the long fibers (B) can be obtained in the same manner as the electrical conductivity of the short fibers (A).

If the long fibers (B) have an electrical conductivity of 50 mS/cm or more, the electroconductive paths that are formed of the long fibers (B) and electrically connect the first principal surface to the second principal surface have small electrical resistance, and smooth transfer of electrons from the active material far from the current collector can be easily achieved, and therefore desirable.

The long fibers (B) preferably have an average fiber diameter of 0.1 to 100 μm, and more preferably 0.5 to 2.0 μm.

The fiber diameter of the long fibers (B) is measured by SEM observation. The average fiber diameter of the long fibers (B) is determined as follows; for ten fibers with fiber length of 100 μm or more and 1000 μm or less, which are present in a 2 mm square field of view, the diameter at or near the middle of each fiber is measured, and this measurement is performed for three fields of view and the average of the diameters of a total of 30 fibers is taken as the measured value.

Furthermore, for production of an electrode for a lithium ion battery, if two or more kinds of electroconductive fibers are used and the type (i.e., product number) and average fiber diameter of the electroconductive fibers that are used are known, the measurement described above is not carried out. Instead, the average fiber diameter value of the electroconductive fibers that are used may be used as average fiber diameter of the short fibers (A) and the long fibers (B).

Based on the volume of the electrode, it is preferable that the volume proportion of the short fibers (A) is 0.1 to 15% by volume. It is more preferably 0.5 to 5% by volume.

The volume proportion of the short fibers (A) based on the volume of the electrode is derived from the following equation.

[Volume proportion of the short fibers (A) based on volume of electrode][%]=[(Weight of the short fibers (A) that are used per unit area of electrode)/(Specific gravity of the short fibers (A))]/ [(Unit area of electrode)×(Electrode thickness)]×100

Furthermore, when volume proportion of the short fibers (A) is obtained, fibers of which fiber length is 50 nm or more and less than 100 μm are taken as the short fibers (A).

Based on the volume of the electrode, it is preferable that the volume proportion of the long fibers (B) is 0.001 to 15% by volume. It is more preferably 0.1 to 3% by volume.

The volume proportion of the long fibers (B) based on the volume of the electrode is derived from the following equation.

[Volume proportion of the long fibers (B) based on volume of electrode][%]=[(Weight of the long fibers (B) that are used per unit area of electrode)/(Specific gravity of the long fibers (B))]/ [(Unit area of electrode)×(Electrode thickness)]×100

Furthermore, when volume proportion of the long fibers (B) is obtained, fibers of which fiber length is 100 μm or more and 1000 μm or less are taken as the long fibers (B).

Furthermore, for production of an electrode for a lithium ion battery, if two or more kinds of electroconductive fibers are used and the type (i.e., product number), specific gravity, and use amount (weight) of the electroconductive fibers that are used are known, it is also possible that the volume proportion of the short fibers (A) and the long fibers (B) is obtained by having the electroconductive fibers with average fiber length of 50 nm or more and less than 100 μm as the short fibers (A) and the fibers with average fiber length of 100 μm or more and 1000 μm or less as the long fibers (B).

Setting the volume proportion of the short fibers (A) and the volume proportion of the long fibers (B) as described above means that the volume of the short fibers (A) and the long fibers (B) in the electrode is preferably relatively small compared to the active material particles (C).

Furthermore, small volume proportion of the short fibers (A) and small volume proportion of the long fibers (B) mean that voids not occupied by the short fibers (A) and the long fibers (B) are filled with the active material particles (C), and according to filling with the active material particles (C), an electrode for a lithium ion battery with high capacity can be provided.

Furthermore, in the electrode for a lithium ion battery of the present invention, the volume proportion of the active material particles (C) is preferably 30 to 80% by volume, and more preferably 40 to 60% by volume, based on the volume of the electrode. As the proportion of the active material particles (C) increases, the electrode for a lithium ion battery can have high capacity.

In the electrode for a lithium ion battery of the present invention, the ratio $(V_A/V_B)$ of the volume $(V_A)$ of the short fibers (A) to the volume $(V_B)$ of the long fibers (B) is preferably 0.2 to 50, and more preferably 0.25 to 5.

Furthermore, in the electrode for a lithium ion battery of the present invention, the ratio $[(V_A+V_B)/V_C]$ of the total $(V_A+V_B)$ of the volume $(V_A)$ of the short fibers (A) and the volume $(V_B)$ of the long fibers (B) to the volume $(V_C)$ of the active material particles (C) is preferably 0.00125 to 0.5, and more preferably 0.02 to 0.3.

As the volume $(V_A)$ of the short fibers (A) and the volume $(V_B)$ of the long fibers (B) are small and there are mostly the active material particles (C), the electrode for a lithium ion battery can have high capacity.

Furthermore, the volume $(V_A)$ of the short fibers (A), the volume $(V_B)$ of the long fibers (B), and the volume $(V_C)$ of the active material particles (C) are determined by the following method.

An electrolyte solution or the like is dried and an electrode containing a mixture of the short fibers (A), the long fibers (B), and the active material particles (C) is measured for weight [w (g)] per $cm^2$ of the electrode and the film thickness [t (cm)] of the electrode. Then, calculation is made based on the true specific gravity [dA (g/cm$^3$)] of the short fibers (A), the true specific gravity [dB (g/cm$^3$)] of the long fibers (B), and the true specific gravity [dC (g/cm$^3$)] of the active material particles (C), and injection ratio (WA, WB, WC) of the short fibers (A), the long fibers (B), and the active material particles (C) relative to the total weight of the materials constituting the electrode of the present invention.

$$V_A=(w \times WA/dA)/(t \times 1) \times 100$$

$$V_B=(w \times WB/dB)/(t \times 1) \times 100$$

$$V_C=(w \times WC/dC)/(t \times 1) \times 100$$

Examples of the electroconductive fibers to become the short fibers (A) and the long fibers (B) include carbon fibers such as PAN carbon fibers and pitch carbon fibers, electroconductive fibers containing a highly conductive metal or graphite uniformly dispersed in synthetic fibers, metal fibers obtained by converting metals such as stainless steel into fibers, electroconductive fibers containing organic fibers whose surface is coated with a metal, and electroconductive fibers containing organic fibers whose surface is coated with a resin containing a conductive substance. Among these electroconductive fibers, carbon fibers are preferred.

The positive electrode active material particles (14) are active material particles (C) of the electrode for a lithium ion battery of the present invention. Examples of the positive electrode active material particles include composite oxides of lithium and transition metals (e.g., LiCoO$_2$, LiNiO$_2$, LiMnO$_2$, LiMn$_2$O$_4$, and lithium nickel composite oxide like LiNi$_{0.8}$Co$_{0.15}$Al$_{0.05}$O$_2$), transition metal oxides (e.g., MnO$_2$, V$_2$O$_5$), transition metal sulfides (e.g., MoS$_2$, TiS$_2$) and conductive polymers (e.g., polyaniline, polyvinylidene fluoride, polypyrrole, polythiophene, polyacetylene, poly-p-phenylene, and polycarbazole).

Furthermore, lithium nickel composite oxide like LiNi$_{0.8}$Co$_{0.15}$Al$_{0.05}$O$_2$ indicates a composite oxide which is represented by the following general formula (1), and it is a compound represented by the general formula (1): Li$_x$(Ni$_{1-y}$Co$_y$)$_{1-z}$M$_z$O$_2$ (with the proviso that, in the formula, x, y, and z are $0.98 \leq x \leq 1.10$, $0.05 \leq y \leq 0.4$, and $0.01 \leq z \leq 0.2$, and M is at least one metal element selected from the group consisting of Al, Mg, Mn, Ti, Fe, Cu, Zn, and Ga).

Preferred examples thereof include lithium-nickel-manganese-cobalt composite oxide and lithium-nickel-cobalt-aluminum composite oxide.

In the electrode for a lithium ion battery of the present invention, the active material particles (C) are preferably coated active material particles whose surface is at least partially coated with a coating agent containing a coating resin and a conductive aid.

In the embodiment illustrated in FIG. 2, the periphery of the positive electrode active material particles (14) is coated with a coating agent (15). The coating agent contains a coating resin. If the periphery of the positive electrode active material particles is coated with a coating agent, change in the volume of the electrode can be reduced, and the expansion of the electrode can be suppressed. Examples of the coating resin include vinyl resins, urethane resins, polyester resins, polyamide resins, epoxy resins, polyimide resins, silicone resins, phenol resins, melamine resins, urea resins, aniline resins, ionomer resins, and polycarbonates. Among these resins, vinyl resins, urethane resins, polyester resins, and polyamide resins are preferred.

In the electrode for a lithium ion battery of the present invention, if coated active material particles are used as the active material particles (C), it is preferable that the electrode for a lithium ion battery does not contain a binding agent (also referred to as a binder). Examples of the binding agent described herein include a known binding agent which is used for the purpose of binding between active material particles and a current collector and between active material particles in an electrode for a lithium ion battery (a polymer compound such as starch, polyvinylidene fluoride, polyvinyl alcohol, carboxymethyl cellulose, polyvinyl pyrolidone, tetrafluoroethylene, styrene-butadiene rubber, polyethylene, and polypropylene).

For an electrode for a lithium ion battery in which active material particles that are not coated active material particles are used, it is necessary to maintain the electroconductive path by fixing the active material particles in the electrode using a binding agent. However, for a case in which coated active material particles are used, the electroconductive path can be maintained without fixing the active material particles in the electrode by an action of a coating resin. As such, it is not necessary to add a binding agent. As no binding agent is added, the active material particles are not fixed in the electrode so that the ability of acting against a change in the volume of the active material particles can be improved.

The electroconductive path formed of the short fibers (13A) and the long fibers (13B) are in contact with the positive electrode active material particles (14) around the electroconductive path. Such contact of the electroconductive path with the positive electrode active material particles allows the electrons generated from the positive electrode active material particles to quickly reach the electroconductive path and flow through the electroconductive path to the current collector. Since the electroconductive path is formed of the electroconductive fibers that are an electronically conductive material, electrons can smoothly reach the current collector.

Furthermore, in a case in which the active material particles are coated active material particles, it can be regarded that the electroconductive path is in contact with the active material particles even when the coating agent is in contact with the electroconductive path.

In an electrode without such an electroconductive path, electrons have to pass through active material particles, which are not highly electronically conductive, and thus they are less likely to smoothly reach the current collector. In a case in which electrons are conducted via a conductive aid that is particulate substance, there is electrical resistance between the particles. In addition, since the particles of the conductive aid are not continuously joined to one another, electrons unavoidably pass through regions with high electrical resistance. Electrons are thus less likely to smoothly reach the current collector.

Furthermore, in the foregoing description, the movement of electrons is described referring to cases in which electrons generated from the positive electrode active material particles flow to the current collector. Similarly, electrons flowing from the current collector to the positive electrode active material particles can pass through electroconductive path and smoothly reach the positive electrode active material particles. That is, the same effects can be obtained in charge and discharge.

The positive electrode (10) may further contain a conductive aid (16).

The conductive aid is selected from materials having electroconductivity.

Specific examples thereof include, but not limited to, metals [e.g., aluminum, stainless steel (SUS), silver, gold, copper, titanium], carbon [e.g., graphite, carbon blacks (acetylene black, Ketjen black, furnace black, channel black, thermal lamp black)], and mixtures thereof.

These conductive aids may be used alone or two or more thereof may be used in combination. Alloys or metal oxides thereof may be used. From the viewpoint of the electrical stability, aluminum, stainless steel, carbon, silver, gold, copper, titanium, and mixtures thereof are preferred, silver, gold, aluminum, stainless steel, and carbon are more preferred, and carbon is still more preferred. The conductive aid may be a particulate ceramic material or resin material coated with a conductive material (any of the metals mentioned above as materials of the conductive aid) by plating, for example.

The conductive aid (16) may be contained in the coating agent (15), or the conductive aid (16) may be in contact with the positive electrode active material particles (14). If the conductive aid is contained in the coating agent or in contact with the positive electrode active material particles, electron conductivity from the positive electrode active material particles to the electroconductive path can be further enhanced.

If the electrode for a lithium ion battery of the present invention is a negative electrode, the electrode may have the same constitution except that negative electrode active material particles are used as active material particles (C) instead of the positive electrode active material particles.

Examples of the negative electrode active material particles include graphite, non-graphitizable carbon, amorphous carbon, products obtained by firing polymer compounds (e.g., products obtained by firing and carbonizing phenolic resins or furan reins), cokes (e.g., pitch cokes, needle cokes, petroleum cokes), carbon fibers, conductive polymers (e.g., polyacetylene, polypyrrole), tin, silicon, and metal alloys (e.g., lithium-tin alloy, lithium-silicon alloy, lithium-aluminum alloy, lithium-aluminum-manganese alloy), and composite oxides of lithium and transition metals (e.g., $Li_4Ti_5O_{12}$).

Also in the negative electrode, the electroconductive path is in contact with negative electrode active material particles around the electroconductive path. As in the case of the positive electrode, electrons generated from the negative electrode active material particles quickly reach the electroconductive path and pass through the electroconductive path smoothly to the current collector. Furthermore, electrons flowing from the current collector to the negative electrode active material particles can smoothly reach the negative electrode active material.

Furthermore, even for a case in which the electrode for a lithium ion battery of the present invention is a negative electrode, if coated active material particles are used as the active material particles (C), it is preferable that the electrode for a lithium ion battery does not contain a binding agent. The reason is the same as a case in which an electrode for a lithium ion battery is a positive electrode.

In the electrode for a lithium ion battery according to the embodiment illustrated in FIG. 2, the short fibers (A), the long fibers (B), and the active material particles (C) may be fixed onto a film (E) such that the fixed shape can be retained loosely to the extent that they do not flow. If the film (E) is made of a material having high conductivity (conductive material), the film (E) can be used instead of a current collector. In addition, the conductivity is not inhibited even if the film (E) contacts a current collector, and therefore desirable. The film (E) is not illustrated in FIG. 2. The method for producing the electrode for a lithium ion battery in which the short fibers (A), the long fibers (B), and the active material particles (C) are fixed onto the film (E) will be described later in detail.

Next, the method for producing the electrode for a lithium ion battery of the present invention is described.

One aspect of the method for producing the electrode for a lithium ion battery of the present invention is a method for producing the electrode for a lithium ion battery of the present invention, characterized by including step (Q1) of applying a slurry (Y) containing the short fibers (A), the long fibers (B), and the active material particles (C) to a film (E); and step (Q2) of fixing the active material particles (C), the short fibers (A), and the long fibers (B) onto the film (E) by pressurization or depressurization.

The production method according to the aspect mentioned above is suitable for producing the electrode for a lithium ion battery according to the embodiment illustrated in FIG. 2. In particular, this method is suitable for producing a positive electrode for a lithium ion battery.

Figure 3A:
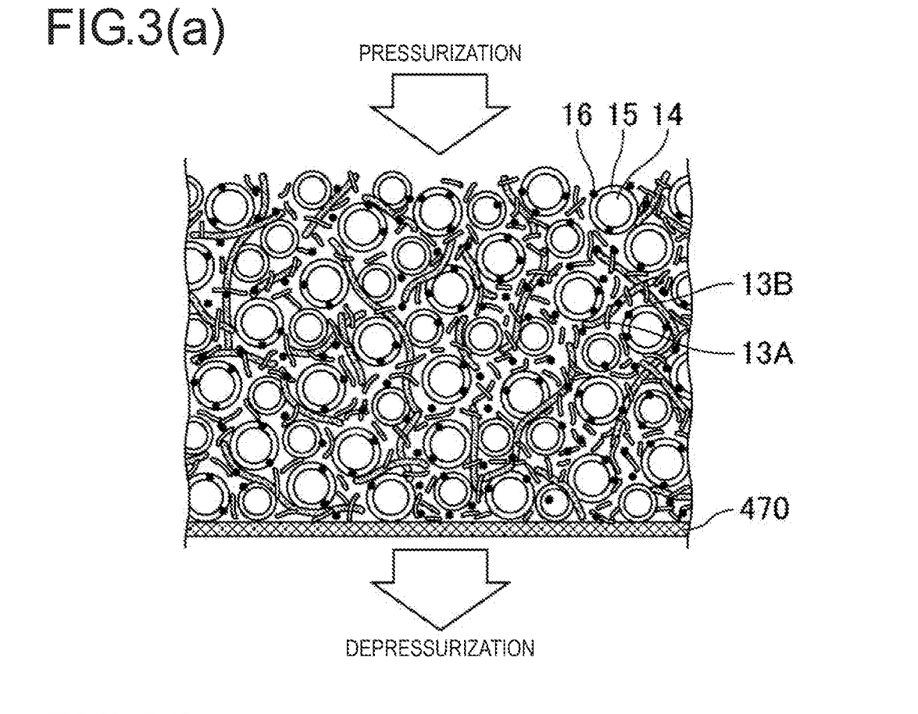
FIG. 3(a) and FIG. 3(b) are process diagrams which schematically illustrate a step of fixing short fibers, long fibers, and active material particles onto a film.
Figure 3B:
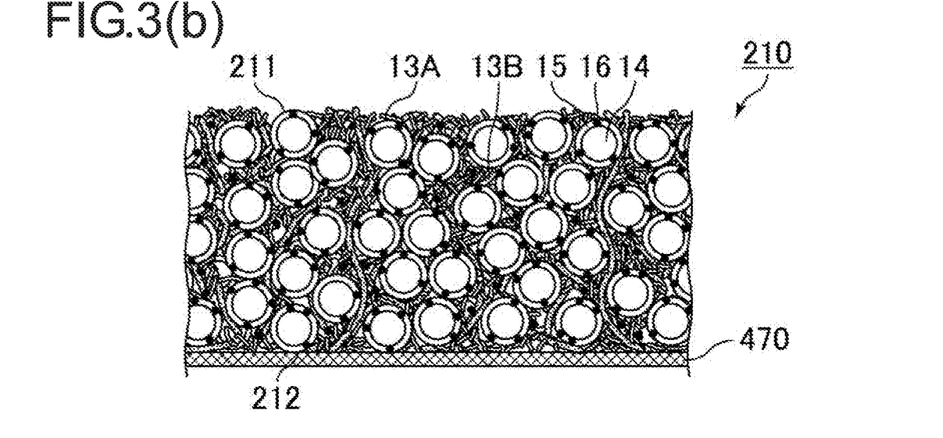

FIG. 3(a) and FIG. 3(b) are process diagrams schematically illustrating a step of fixing short fibers, long fibers, and active material particles onto a film.

First, the slurry (Y) containing the short fibers (A), the long fibers (B), and the active material particles (C) is applied to a film (E) (step Q1).

The slurry (Y) may be, for example, a slurry obtained by further adding the short fibers (A) and the long fibers (B) into the slurry (X) containing active materials and dispersing the short fibers (A) and the long fibers (B) in the slurry.

The active material particles (C) may be any of those mentioned in the description of the electrode for a lithium ion battery of the present invention, and coated active material particles can be suitably used. The coated active material particles can be obtained as follows, for example. Particles of a lithium ion battery active material are fed into a universal mixer. While stirring at 30 to 500 rpm, a resin solution containing a resin for coating the lithium ion battery active material is added dropwise over 1 to 90 minutes, and further a conductive aid is added. While stirring continues, the temperature is raised to 50 to 200° C. After lowering the pressure to 0.007 to 0.04 MPa, the mixture is held for 10 to 150 minutes, whereby coated active material particles are obtained.

The slurry (X) containing the active material particles (C) is preferably a solvent slurry (X1) containing a solvent (F) or an electrolyte solution slurry (X2) containing an electrolyte solution (D).

Examples of the solvent (F) include water, 1-methyl-2-pyrolidone (N-methyl pyrolidone), methyl ethyl ketone, dimethyl formamide, dimethyl acetamide, N,N-dimethylaminopropylamine, and tetrahydrofuran.

Furthermore, as the electrolyte solution (D), an electrolyte solution containing an electrolyte and a non-aqueous solvent, which is used for producing lithium ion batteries may be used.

An electrolyte that is used for common electrolyte solutions may be used as the electrolyte. Examples thereof include lithium salts of inorganic acids such as $LiPF_6$, $LiBF_4$, $LiSbF_6$, $LiAsF_6$, and $LiClO_4$ and lithium salts of organic acids such as $LiN(CF_3SO_2)_2$, $LiN(C_2F_5SO_2)_2$, and $LiC(CF_3SO_2)_3$. Among these, from the viewpoint of the output power of the battery and the charge and discharge cycle characteristics, $LiPF_6$ is preferred.

A non-aqueous solvent that is used for common electrolyte solutions may be used as the non-aqueous solvent. Examples thereof include lactone compounds, cyclic or chain carbonic acid esters, chain carboxylic acid esters, cyclic or chain ethers, phosphoric acid esters, nitrile compounds, amide compounds, sulfone, sulfolane, and mixtures thereof.

The non-aqueous solvents may be used either singly or in combination of two or more kinds thereof.

Among the non-aqueous solvents, lactone compounds, cyclic carbonic acid esters, chain carbonic acid esters, and phosphoric acid esters are preferred from the viewpoint of the output power of the battery and the charge and discharge cycle characteristics. Lactone compounds, cyclic carbonic acid esters, and chain carbonic acid esters are more preferred. Mixtures of cyclic carbonic acid esters and chain carbonic acid esters are still more preferred. A mixture of ethylene carbonate (EC) and diethyl carbonate (DEC) is particularly preferred.

The slurry (X) is preferably prepared by dispersing and slurrying the active material particles (C) and optionally a conductive aid and a binding agent at a concentration of 10 to 60% by weight based on the weight of the solvent or the electrolyte solution.

The conductive aid may be any of those mentioned in the description of the electrode for a lithium ion battery of the present invention.

Examples of the binding agent include polymer compounds such as starch, polyvinylidene fluoride, polyvinyl alcohol, carboxymethyl cellulose, polyvinyl pyrolidone, tetrafluoroethylene, styrene-butadiene rubber, polyethylene, and polypropylene.

Furthermore, when coated active material particles are used as the active material particles (C), the slurry (X) is preferably not added with a binding agent. For an electrode for a lithium ion battery in which active material particles that are not coated active material particles are used, it is necessary to maintain the electroconductive path by fixing the active material particles in the electrode using a binding agent. However, for a case in which coated active material particles are used, the electroconductive path can be maintained without fixing the active material particles in the electrode by an action of a coating resin. As such, it is not necessary to add a binding agent. As no binding agent is added, the active material particles are not fixed in the electrode so that the ability of acting against a change in the volume of the active material particles can be improved.

As for the short fibers (A) and the long fibers (B), the short fibers and the long fibers (B) which have been described in the pages relating to the electrode for a lithium ion battery of the present invention can be used.

The slurry (Y) is preferably an electrolyte solution slurry (Y1) containing an electrolyte solution (D). The electrolyte solution (D) may be the same as the electrolyte solution (D) for the electrolyte solution slurry (X2) described above. If the slurry (Y) is the electrolyte solution slurry (Y1) containing the electrolyte solution (D), it is preferable from the viewpoint that impurities other than an electrolyte solution are not incorporated as a liquid component in an electrode for a lithium ion battery. Furthermore, the slurry (Y) may be a solvent slurry containing a solvent (F).

The film (E) is preferably a film capable of separating the active material particles and the conductive member from the electrolyte solution and the solvent in the subsequent pressurization or depressurization step. If the film (E) is made of a material having high conductivity (conductive material), the film (E) can be used instead of the current collector. In addition, the conductivity is not inhibited even if the film (E) contacts the current collector, and therefore desirable. For example, a material with an electrical conductivity of 100 mS/cm or more can be suitably used.

Examples of materials with such properties include filter paper blended with electroconductive fibers such as carbon fibers and metal mesh.

As for the metal mesh, it is preferable to use a mesh made of stainless steel. Examples of such a metal mesh include SUS316-made twilled dutch weave wire mesh (manufactured by Sunnet Industrial Co., Ltd.). The metal mesh preferably has an opening size that does not allow the active material particles or the conductive member to pass through the mesh. For example, a metal mesh of 2300 mesh is preferably used.

The slurry (Y) can be applied to the film (E) with any application device. Examples thereof include a bar coater and a brush.

FIG. 3(a) schematically illustrates a state in which a slurry is applied to a film. A slurry containing the positive electrode active material particles (14), the short fibers (13A), and the long fibers (13B) is applied to a filter paper (470) as a film.

Next, the active material particles (C), the short fibers (A), and the long fibers (B) are fixed onto the film (E) by pressurization or depressurization (step Q2).

Examples of the method for pressurization operation include pressing from above the coating surface of the slurry using a pressing machine. Furthermore, examples of the method for depressurization operation include suction using a vacuum pump with filter paper or mesh applied to the surface of the structure to which the slurry is not applied.

By the pressurization or depressurization, the electrolyte solution or the solvent is removed from the slurry (Y), and the short fibers (A), the long fibers (B), and the active material particles (C) are fixed onto the film (E) such that the fixed shape is retained loosely to the extent that they do not flow.

FIG. 3(b) illustrates an electrode (210) in which the short fibers (13A), the long fibers (13B), and the positive electrode active material particles (14) are fixed on the filter paper (470).

If the film (E) in the electrode (210) is made of a conductive material, the film (E) can be used as a current collector. Alternatively, the film (E) and a current collector may be brought into contact so that they can serve as one current collector. Accordingly, a second principal surface (212) in the electrode (210) can be defined as a portion in which the short fibers (13A) and/or the long fibers (13B) contact the filter paper (470).

If the film (E) is made of a non-conductive material, the film (E) is preferably disposed on the separator side. Alternatively, the film (E) may be used as a separator. Examples of the film made of a non-conductive material include an aramid separator (manufactured by Japan Vilene Company, Ltd.).

Furthermore, if the slurry (Y) is an electrolyte solution slurry (Y1) containing an electrolyte solution (D), the film (E) is preferably a film impermeable to the active material particles (C) but permeable to the electrolyte solution (D), and the electrolyte solution (D) is preferably allowed to permeate the film (E) by pressurization or depressurization so as to be removed in the step (Q2).

Furthermore, a press step (Q3) of pressurizing the slurry (Y) at a higher pressure is preferably performed after the step (Q2).

The press step (Q3) is a step in which the pressure difference is adjusted to be greater than that in the pressurization or depressurization in step (Q2) in order to increase the density of the active material particles (C). The press step (Q3) is a concept which encompasses both embodiments of pressurization in a case in which depressurization is performed in step (Q2) and pressurization at a higher pressure in a case in which pressurization is performed in step (Q2).

It is preferred to further perform step (Q4) of transferring the electrode for a lithium ion battery fixed onto the film (E) to a principal surface of a current collector or a separator so as to form an electrode for a lithium ion battery having a first principal surface thereof on a principal surface of the separator or form an electrode for a lithium ion battery having a second principal surface thereof on a principal surface of the current collector.

If step (Q4) is performed, the electrode for a lithium ion battery fixed onto the film (E) is preferably transferred by bringing a principal surface [first principal surface (211) in FIG. 3(b)] of the electrode opposite the film (E) into contact with a principal surface of a current collector or a separator.

If the film (E) is made of a conductive material and used instead of a current collector, the electrode is preferably transferred by bringing a principal surface opposite the film (E) into contact with a principal surface of a separator. If the film (E) is not used as a current collector, a step of removing the film (E) is preferably performed after step (Q4).

Yet another aspect of the method for producing the electrode for a lithium ion battery of the present invention is a method for producing the electrode for a lithium ion battery of the present invention characterized by including step (T1) of applying a slurry (Y) containing the short fibers (A), the long fibers (B), and the active material particles (C) onto a current collector to form a slurry layer onto the current collector; and step (T2) of disposing a separator on the slurry layer and absorbing liquid from an upper surface of the separator so as to fix the active material particles (C), the short fibers (A), and the long fibers (B) between the current collector and the separator.

The production method according to the above aspect is suitable for producing the electrode for a lithium ion battery according to the embodiment described with reference to FIG. 2. In particular, the method is suitable for producing a negative electrode for a lithium ion battery.

Figures 4A, 4B, 4C:
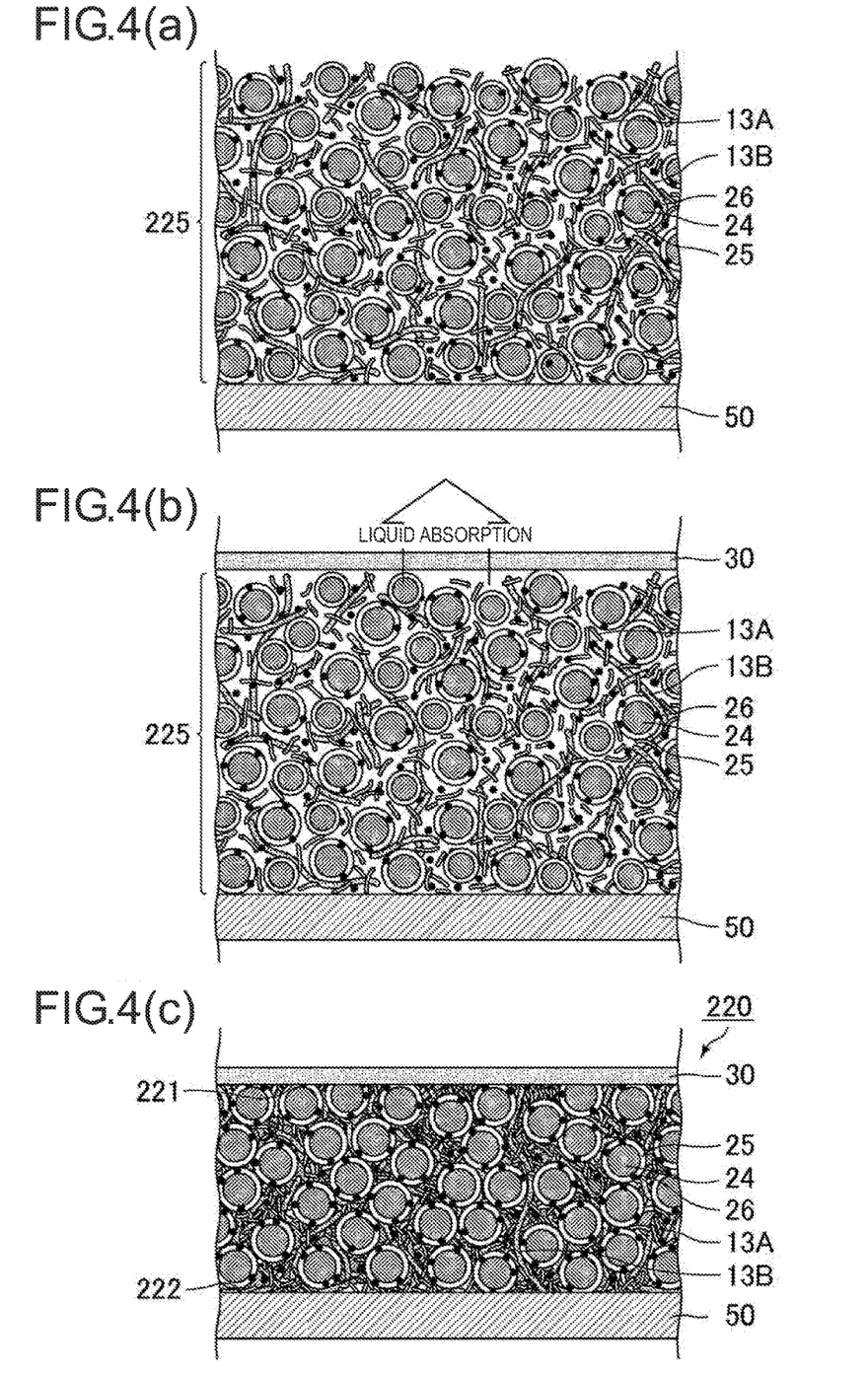
FIG. 4(a), FIG. 4(b), and FIG. 4(c) are process diagrams which schematically illustrate a step of fixing active material particles, short fibers, and long fibers between a current collector and a separator.

FIG. 4(a), FIG. 4(b), and FIG. 4(c) are process diagrams schematically illustrating a step of fixing active material particles, short fibers, and long fibers between a current collector and a separator.

First, a slurry (Y) containing the short fibers (A), the long fibers (B), and the active material particles (C) is applied onto a current collector so as to form a slurry layer (step T1).

The current collector may be, for example, aluminum, copper, aluminum, titanium, stainless steel, nickel, baked carbon, conductive polymer, or conductive glass.

The slurry (Y) may be the same as the slurry (Y) described above with reference to FIG. 3(a). Examples thereof include a slurry obtained by further adding the short fibers (A) and the long fibers (B) into the slurry (X) and dispersing the short fibers (A) and the long fibers (B) in the slurry.

The slurry (Y) is preferably an electrolyte solution slurry (Y1) containing an electrolyte solution (D). The electrolyte solution (D) may be the same as the electrolyte solution (D) described above for the electrolyte solution slurry (X2). The slurry (Y) may be a solvent slurry containing a solvent (F).

The slurry (Y) can be applied to the current collector with any application device like a bar coater and a brush.

FIG. 4(a) schematically illustrates a state in which a slurry layer (225) is formed by applying a slurry onto a current collector (50). A slurry containing negative electrode active material particles (24), the short fibers (13A), and the long fibers (13B) is applied onto the current collector (50). The applied slurry forms the slurry layer (225).

In the embodiment illustrated in FIG. 4(a), the periphery of the negative electrode active material particles (24) is coated with a coating agent (25). The slurry contains a conductive aid (26).

The short fibers (13A), the long fibers (13B), the coating agent (25), and the conductive aid (26) are the same as the short fibers (13A), the long fibers (13B), the coating agent (15), and the conductive aid (16) that are described in detail above for the electrode (positive electrode) for a lithium ion battery of the present invention.

Also, the negative electrode active material particles (24) are the same as the negative electrode active material particles described for the electrode for a lithium ion battery of the present invention.

Next, a separator is disposed onto the slurry layer, and liquid is absorbed from an upper surface of the separator so as to fix the active material particles (C), the short fibers (A), and the long fibers (B) between the current collector and the separator (step T2). First, as illustrated in FIG. 4(b), a separator (30) is disposed on a slurry layer (225), and then liquid is absorbed from the upper surface of the separator (30).

Examples of the separator include aramid separators (manufactured by Japan Vilene Company, Ltd.), microporous polyethylene films, microporous polypropylene films, multilayer films composed of a porous polyethylene film and a porous polypropylene film, nonwoven fabrics containing polyester fibers, aramid fibers, or glass fibers, and separators containing ceramic microparticles such as silica, alumina, or titania particles attached to the surface of any of these films or nonwoven fabrics.

The liquid absorption may be performed as follows: Pressurization from the upper surface or the lower surface of the separator is performed to allow liquid to exude from the upper surface of the separator, and the exuded liquid is absorbed. Or, the liquid absorption may be performed by depressurization from the upper surface of the separator to suction liquid. Alternatively, the liquid absorption may be performed from the upper surface of the separator by disposing a liquid-absorbing material on the upper surface of the separator.

The liquid-absorbing material may be liquid-absorbing cloth such as towel, paper, or a liquid-absorbing resin.

By absorption of liquid, the electrolyte solution or the solvent is removed from the slurry (Y). The short fibers (A), the long fibers (B), and the active material particles (C) are thus fixed between the current collector and the separator so that the fixed shape is retained loosely to the extent that they do not flow.

The pressurization may be performed by various methods, and it is not particularly limited. Examples thereof include pressurization with a known pressing machine and pressurization by disposing a heavy material as a weight. During pressurization, vibrations may be applied with an ultrasonic vibrator or the like. The pressure in the pressurization from the upper surface or the lower surface of the separator is preferably 0.8 to 41 kg/cm$^2$, and more preferably 0.9 to 10 kg/cm$^2$. If the pressure is within this range, the electroconductive path inside the electrode can be favorably formed, which advantageously increases the capacity of a battery.

FIG. 4(c) illustrates an electrode (220) in which the short fibers (13A), the long fibers (13B), and the active material particles (24) are fixed between the current collector (50) and the separator (30).

In the electrode (220), a first principal surface (221) of the electrode is in contact with the separator (30). A second principal surface (222) of the electrode is in contact with the current collector (50).

Such a method for producing an electrode for a lithium ion battery produces an electrode sandwiched between a separator and a current collector. Such a method is preferred because it eliminates the need for an additional step of disposing a separator and a current collector on both sides of the electrode, and enables the production of an electrode with a structure preferred for a bipolar electrode in fewer steps.

A lithium ion battery in which the electrode for a lithium ion battery of the present invention is used can be obtained by assembling the electrode of the present invention with a counter electrode, placing the assembly, together with a separator, into a cell case, pouring an electrolyte solution to the case, and sealing the case.

Alternatively, such a lithium ion battery can be obtained by forming a positive electrode on one surface of a current collector and a negative electrode on the other surface to produce a bipolar electrode, stacking the bipolar electrode on a separator, placing the stack into a cell case, pouring an electrolyte solution, and sealing the cell case.

Furthermore, either one of the positive electrode and the negative electrode may be the electrode for a lithium ion battery of the present invention, or both of the positive electrode and the negative electrode may be the electrode for a lithium ion battery of the present invention to produce a lithium ion battery.

Examples of the separator include microporous polyethylene films, microporous polypropylene films, multilayer films composed of a porous polyethylene film and a porous polypropylene film, nonwoven fabrics made of polyester fibers, aramid fibers, or glass fibers, and separators containing ceramic microparticles such as silica, alumina, or titania particles attached to the surface of any of these films or nonwoven fabrics.

As for the electrolyte solution, the electrolyte solution described above as the electrolyte solution (D) may be used.

EXAMPLES

Next, the present invention will be specifically described below based on examples. The present invention is not limited to the examples, as long as it does not depart from the scope of the present invention. The "part(s)" refers to part(s) by weight and "%" refers to % by weight, if not otherwise specified.

<Preparation of Coating Resin Solution>

A four-necked flask equipped with a stirring device, a thermometer, a reflux condenser, a dropping funnel, and a nitrogen gas injection tube was charged with 83 parts of ethyl acetate and 17 parts of methanol. The temperature was then raised to 68° C. Subsequently, a monomer mixture containing 242.8 parts of methacrylic acid, 97.1 parts of methyl methacrylate, 242.8 parts of 2-ethylhexyl methacrylate, 52.1 parts of ethyl acetate, and 10.7 parts of methanol and an initiator solution containing 0.263 part of 2,2'-azobis(2,4-dimethyl valeronitrile) dissolved in 34.2 parts of ethyl acetate were added dropwise through the dropping funnel continuously over four hours under stirring, while blowing nitrogen into the four-necked flask. Thus, radical polymerization was performed. After the completion of the dropwise addition, an initiator solution containing 0.583 part of 2,2'-azobis(2,4-dimethylvaleronitrile) dissolved in 26 parts of ethyl acetate was continuously added over two hours through the dropping funnel. The polymerization was further continued at the boiling point for four hours. The solvent was removed and 582 parts of a resin was obtained. Thereafter, 1,360 parts of isopropanol was added to the resin, so that a coating resin solution consisting of a vinyl resin with a resin concentration of 30% by weight was obtained.

<Preparation of Coated Positive Electrode Active Material Particles (C-1)>

96 parts by weight of $LiCoO_2$ powder [CELLSEED C-8G manufactured by Nippon Chemical Industrial Co., Ltd.] was added to a universal mixer, and in a state in which the powder was stirred at 150 rpm at room temperature, the coating resin solution (resin solid concentration of 30% by weight) was added dropwise over 60 minutes such that the resin solid content becomes 2 parts by weight followed by further stirring for 30 minutes.

Subsequently, while stirring, 2 parts by weight of acetylene black [manufactured by Denka Company Limited, DENKA BLACK (registered trademark)] was added to the mixture in three divided portions. The temperature was raised to 70° C. while stirring for 30 minutes. The pressure was reduced to 100 mmHg and the mixture was held for 30 minutes. According to this operation, coated positive electrode active material particles (C-1) were obtained.

<Preparation of Coated Positive Electrode Active Material Particles (C-2)>

Coated positive electrode active material particles (C-2) were obtained in the same manner as in the preparation method of (C-1) except that the 96 parts by weight of $LiCoO_2$ powder [CELLSEED C-8G manufactured by Nippon Chemical Industrial Co., Ltd.] was changed to the $LiNi_{0.8}Co_{0.15}Al_{0.05}O_2$ powder (hereinbelow, also described as NCA).

<Preparation of Coated Negative Electrode Active Material Particles (C-3)>

90 Parts by weight of non-graphitizable carbon [manufactured by Kureha Battery Materials Japan Co., Ltd., CARBOTRON (registered trademark) PS(F)] was put into a universal mixer. While stirring at 150 rpm at room temperature, the coating resin solution (resin solid concentration of 30% by weight) was added dropwise over 60 minutes such that the resin solid content becomes 5 parts by weight. The resulting mixture was further stirred for 30 minutes.

Subsequently, while stirring, 5 parts by weight of acetylene black [manufactured by Denka Company Limited, DENKA BLACK (registered trademark)] was added to the mixture in three divided portions. The temperature was raised to 70° C. while stirring for 30 minutes. The pressure was reduced to 0.01 MPa and the mixture was held for 30 minutes. According to this operation, coated negative electrode active material particles (C-3) were obtained.

<Preparation of Short Fibers (A-1)>

The short fibers (A-1) were prepared with reference to the preparation method disclosed in Eiichi Yasuda, Asao Oya, Shinya Komura, Shigeki Tomonoh, Takashi Nishizawa, Shinsuke Nagata, Takashi Akatsu, CARBON, 50, 2012, 1432-1434 and Eiichi Yasuda, Takashi Akatsu, Yasuhiro Tanabe, Kazumasa Nakamura, Yasuto Hoshikawa, Naoya Miyajima, TANSO, 255, 2012, pages 254 to 265.

10 Parts by weight of synthetic mesophase pitch AR•MPH [manufactured by Mitsubishi Gas Chemical Company, Inc.] as a carbon precursor and 90 parts by weight of polymethylpentene TPX RT18 [manufactured by Mitsui Chemicals, Inc.] were melt-kneaded at a barrel temperature of 310° C. under nitrogen atmosphere using a single-screw extruder. Thus, a resin composition was prepared.

The resin composition was melt-extruded and spun at 390° C. The spun resin composition was put in an electric furnace and held at 270° C. under nitrogen atmosphere for three hours, so that the carbon precursor was stabilized. Subsequently, the temperature of the electric furnace was raised to 500° C. over one hour and held at 500° C. for one hour, so that the polymethylpentene was decomposed and removed. The temperature of the electric furnace was raised to 1000° C. over two hours, and held at 1000° C. for 30 minutes, so that the remaining stabilized carbon precursor was converted into electroconductive fibers.

90 parts by weight of the obtained electroconductive fibers, 500 parts by weight of water, and 1000 parts by weight of zirconia balls (ϕ 0.1 mm) were put into a pot mill and the electroconductive fibers were pulverized for five minutes. The zirconia balls were removed by classification and then the electroconductive fibers were dried at 100° C. Thus, the short fibers (A-1) were obtained.

From the measurement results using SEM, the average fiber diameter was found to be 0.3 μm and the average fiber length was found to be 26 μm. Furthermore, the electrical conductivity of the short fibers (A-1) was found to be 600 mS/cm.

<Preparation of Short Fibers (A-2)>

The short fibers (A-2) with electrical conductivity were obtained in the same manner as the short fibers (A-1) except that the conditions for melt extrusion spinning were changed.

From the measurement results using SEM, the average fiber diameter was found to be 0.2 μm and the average fiber length was found to be 9 μm.

Furthermore, the electrical conductivity of the short fibers (A-2) was found to be 600 mS/cm.

<Provision of Long Fibers (B-1)>

Carbonaceous carbon fibers [manufactured by Osaka Gas Chemicals Co., Ltd., DONACARBO Milled S-243, average fiber length: 500 μm, average fiber diameter: 13 μm, electrical conductivity: 200 mS/cm] were provided as the long fibers.

<Provision of Long Fibers (B-2)>

Carbonaceous carbon fibers [manufactured by Osaka Gas Chemicals Co., Ltd., DONACARBO Milled S-344, average fiber length: 960 μm, average fiber diameter: 18 μm, electrical conductivity: 200 mS/cm] were provided as the long fibers.

<Provision of Long Fibers (B'-1)>

Graphitic carbon fibers [manufactured by Osaka Gas Chemicals Co., Ltd., DONACARBO Milled SG-249, average fiber length: 110 μm, average fiber diameter: 13 μm, electrical conductivity: 600 mS/cm] were provided as the long fibers.

<Provision of Long Fibers (B'-2)>

Graphitic carbon fibers [manufactured by Nippon Graphite Fiber Corporation, XN-100-15M, average fiber length: 150 μm, average fiber diameter: 10 μm, electrical conductivity: 600 mS/cm] were provided as the long fibers.

<Preparation of Electrolyte Solution>

$LiPF_6$ was dissolved at a ratio of 1 mol/L in a mixed solvent of ethylene carbonate (EC) and diethyl carbonate (DEC) (volume ratio; 1:1). Thus, an electrolyte solution for a lithium ion battery was prepared.

Example 1: Preparation of Positive Electrode 2 parts by weight of the short fibers (A-1), 1 part by weight of the long fibers (B-1), and 97 parts by weight of $LiCoO_2$ powder [manufactured by Nippon Chemical Industrial Co., Ltd., CELLSEED C-8G] as positive electrode active material particles were mixed with the above electrolyte solution to prepare an electrolyte solution slurry.

A stainless steel mesh [manufactured by Sunnet Industrial Co., Ltd., SUS316 twilled dutch weave, 2300 mesh] was provided as a film (E). The electrolyte solution slurry was applied to the stainless steel mesh and then subjected to suction-filtration (depressurization), so that the positive electrode active material particles, the short fibers, and the long fibers were fixed onto the stainless steel mesh. Thus, a positive electrode for a lithium ion battery was prepared.

Examples 2 to 11 and Comparative Examples 1 to 6

As shown in Table 1, type and volume proportion of the short fibers (A), the long fibers (B), and active materials (C), electrode thickness, and weight per unit area were changed to manufacture a positive electrode for a lithium ion battery.

In Table 1, LCO represents $LiCoO_2$ particles, NCA represents $LiNi_{0.8}Co_{0.15}Al_{0.05}O_2$ particles, coated LCO represents coated LCO particles, and coated NCA represents coated NCA particles.

TABLE 1

| | Electrode composition (wt %) | | | | | | | | | | Electrode Thickness (μm) | Volume proportion (Vol %) of the short fibers (A) |
|---|---|---|---|---|---|---|---|---|---|---|---|---|
| | Short fibers (A) | | Long fibers (B) | | | | Active materials (C) | | Coated LCO (C-1) | Coated NCA (C-2) | | |
| | (A-1) | (A-2) | (B-1) | (B-2) | (B'-1) | (B'-2) | LCO | NCA | | | | |
| Example 1 | 2.0 | — | 1.0 | — | — | — | 97.0 | — | — | — | 750 | 1.9 |
| Example 2 | 2.0 | — | 1.0 | — | — | — | — | 97.0 | — | — | 750 | 1.5 |
| Example 3 | 2.0 | — | — | 1.0 | — | — | — | — | 97.0 | — | 1000 | 1.6 |
| Example 4 | 2.0 | — | — | — | 1.0 | — | — | — | — | 97.0 | 550 | 1.5 |
| Example 5 | 2.0 | — | — | — | — | 1.0 | — | — | 97.0 | — | 500 | 2.2 |
| Example 6 | 2.0 | — | — | — | — | 1.0 | — | — | — | 97.0 | 500 | 1.7 |
| Example 7 | 4.0 | — | 1.5 | — | — | — | — | — | 94.5 | — | 500 | 4.4 |
| Example 8 | 2.0 | — | — | — | 1.0 | — | — | — | — | 97.0 | 80 | 1.7 |
| Example 9 | — | 4.0 | 1.2 | — | — | — | — | — | 94.8 | — | 4200 | 4.0 |
| Example 10 | — | 4.0 | — | 1.2 | — | — | — | — | — | 94.8 | 1000 | 3.3 |
| Example 11 | — | 4.0 | — | — | 1.2 | — | — | — | — | 94.8 | 450 | 3.8 |
| Comparative Example 1 | — | — | 3.0 | — | — | — | 97.0 | — | — | — | 750 | — |
| Comparative Example 2 | — | — | 1.0 | — | — | — | — | — | 99.0 | — | 750 | — |

TABLE 1-continued

| | | | | | | | | | | | |
|---|---|---|---|---|---|---|---|---|---|---|---|
| Comparative Example 3 | — | — | 3.0 | — | — | — | — | — | 97.0 | — | 500 | — |
| Comparative Example 4 | — | — | — | — | 3.0 | — | 97.0 | — | — | — | 250 | — |
| Comparative Example 5 | — | — | 1.75 | — | — | — | — | — | 98.3 | — | 4200 | — |
| Comparative Example 6 | 5.0 | — | — | — | — | — | — | — | — | 95.0 | 80 | 4.3 |

| | Electrode | | | Discharge capacity per weight of active materials (mAh/g) | | Evaluation results |
|---|---|---|---|---|---|---|
| | Volume proportion (Vol %) of the long fibers (B) | Volume proportion (Vol %) of the active materials (C) | Weight per unit area (mg/cm²) | 0.1 C | 1 C | Rate characteristics |
| Example 1 | 1.1 | 43.1 | 160 | 160 | 117 | 92 |
| Example 2 | 0.8 | 32.3 | 120 | 200 | 152 | 96 |
| Example 3 | 0.9 | 36.4 | 180 | 162 | 102 | 83 |
| Example 4 | 0.8 | 34.2 | 93 | 200 | 156 | 94 |
| Example 5 | 1.2 | 48.5 | 120 | 161 | 132 | 98 |
| Example 6 | 0.9 | 37.6 | 93 | 205 | 164 | 95 |
| Example 7 | 1.8 | 47.3 | 120 | 163 | 133 | 97 |
| Example 8 | 0.9 | 37.9 | 15 | 200 | 190 | 88 |
| Example 9 | 1.3 | 43.3 | 920 | 160 | 82 | 82 |
| Example 10 | 1.1 | 35.6 | 180 | 200 | 126 | 83 |
| Example 11 | 1.2 | 40.8 | 93 | 196 | 147 | 88 |
| Comparative Example 1 | 3.2 | 43.1 | 160 | 150 | 85 | 72 |
| Comparative Example 2 | 1.1 | 44.0 | 160 | 155 | 87 | 71 |
| Comparative Example 3 | 3.6 | 48.5 | 120 | 161 | 97 | 72 |
| Comparative Example 4 | 3.6 | 48.5 | 60 | 162 | 84 | 56 |
| Comparative Example 5 | 1.9 | 44.8 | 920 | 158 | 64 | 65 |
| Comparative Example 6 | — | 37.1 | 15 | 183 | 132 | 67 |

In the table, LCO represents $LiCoO_2$ particles, NCA represents $LiNi_{0.8}Co_{0.15}Al_{0.05}O_2$ particles, coated LCO represents coated LCO particles, and coated NCA represents coated NCA particles.

Example 12: Preparation of Negative Electrode 2 parts by weight of the short fibers (A-1), 4.2 parts by weight of the long fibers (B-1), and 93.8 parts by weight of non-graphitizable carbon [manufactured by Kureha Battery Materials Japan Co., Ltd., CARBOTRON (registered trademark) PS(F)] as negative electrode active material particles were mixed with the above electrolyte solution to prepare an electrolyte solution slurry.

An aramid separator (manufactured by Japan Vilene Company, Ltd.) was provided as a film (E). The electrolyte solution slurry was applied to the aramid separator and subjected to suction-filtration (depressurization) while pressurizing at 1.5 kg/cm², so that the negative electrode active material particles and the carbon fibers were fixed onto the aramid separator. Thus, a negative electrode for a lithium ion battery was prepared.

Examples 13 to 22 and Comparative Examples 7 to 11

As shown in Table 2, type and volume proportion of the short fibers (A), the long fibers (B), and active materials (C), electrode thickness, and weight per unit area were changed to manufacture a negative electrode for a lithium ion battery.

In Table 2, HC represents non-graphitizable carbon particles, and coated HC represents coated non-graphitizable carbon particles.

TABLE 2

| | Electrode composition (wt %) | | | | | | | | | Electrode | |
|---|---|---|---|---|---|---|---|---|---|---|---|
| | Short fibers (A) | | Long fibers (B) | | | | Active materials (C) | | Thickness (μm) | Volume proportion (Vol %) of the short fibers (A) |
| | (A-1) | (A-2) | (B-1) | (B-2) | (B'-1) | (B'-2) | HC | Coated HC (C-3) | | |
| Example 12 | 2.0 | — | 4.2 | — | — | — | 93.8 | — | 880 | 0.8 |
| Example 13 | 2.0 | — | 4.2 | — | — | — | — | 93.8 | 550 | 0.8 |
| Example 14 | 2.0 | — | — | 2.0 | — | — | — | 96.0 | 1000 | 0.8 |

TABLE 2-continued

| | | | | | | | | | | |
|---|---|---|---|---|---|---|---|---|---|---|
| Example 15 | 2.0 | — | — | — | 2.0 | — | — | 96.0 | 450 | 0.9 |
| Example 16 | 4.0 | — | — | — | — | 1.0 | — | 95.0 | 450 | 1.7 |
| Example 17 | 2.0 | — | — | — | — | 1.0 | — | 97.0 | 450 | 0.9 |
| Example 18 | 2.0 | — | 0.8 | — | — | — | 97.2 | — | 600 | 0.8 |
| Example 19 | 4.0 | — | — | — | — | 1.0 | — | 95.0 | 80 | 2.3 |
| Example 20 | — | 2.0 | 1.0 | — | — | — | 97.0 | — | 4400 | 0.7 |
| Example 21 | — | 2.0 | — | 1.0 | — | — | — | 97.0 | 1000 | 0.8 |
| Example 22 | — | 2.0 | — | — | 1.0 | — | — | 97.0 | 450 | 0.9 |
| Comparative Example 7 | — | — | 4.0 | — | — | — | 96.0 | — | 880 | — |
| Comparative Example 8 | — | — | 4.0 | — | — | — | 96.0 | — | 650 | — |
| Comparative Example 9 | — | — | — | 4.0 | — | — | 96.0 | — | 390 | — |
| Comparative Example 10 | — | — | 4.0 | — | — | — | 96.0 | — | 4400 | — |
| Comparative Example 11 | 3.0 | — | — | — | — | — | 97.0 | — | 80 | 1.7 |

| | Electrode | | | Discharge capacity per weight of active materials (mAh/g) | | Evaluation results Rate characteristics |
|---|---|---|---|---|---|---|
| | Volume proportion (Vol %) of the long fibers (B) | Volume proportion (Vol %) of the active materials (C) | Weight per unit area (mg/cm$^2$) | 0.1 C | 1 C | |
| Example 12 | 1.9 | 54.0 | 80 | 398 | 305 | 93 |
| Example 13 | 1.9 | 54.0 | 50 | 402 | 312 | 94 |
| Example 14 | 0.9 | 51.6 | 85 | 399 | 244 | 80 |
| Example 15 | 1.0 | 58.1 | 43 | 405 | 309 | 90 |
| Example 16 | 0.5 | 57.5 | 43 | 420 | 350 | 98 |
| Example 17 | 0.5 | 58.7 | 43 | 418 | 357 | 100 |
| Example 18 | 0.4 | 56.4 | 55 | 396 | 297 | 92 |
| Example 19 | 0.6 | 75.2 | 10 | 402 | 364 | 84 |
| Example 20 | 0.4 | 44.6 | 320 | 395 | 204 | 84 |
| Example 21 | 0.4 | 52.2 | 85 | 400 | 241 | 79 |
| Example 22 | 0.5 | 58.7 | 43 | 404 | 304 | 88 |
| Comparative Example 7 | 1.8 | 55.2 | 80 | 389 | 223 | 74 |
| Comparative Example 8 | 1.8 | 56.1 | 60 | 394 | 233 | 73 |
| Comparative Example 9 | 2.1 | 62.3 | 40 | 392 | 248 | 73 |
| Comparative Example 10 | 1.5 | 44.2 | 320 | 381 | 122 | 52 |
| Comparative Example 11 | — | 76.7 | 10 | 403 | 294 | 67 |

In the table, HC represents non-graphitizable carbon particles, and coated HC represents coated non-graphitizable carbon particles.

[Manufacture of Lithium Ion Battery for Evaluating Positive Electrode]

The positive electrode prepared in any one of Examples 1 to 11 and Comparative Examples 1 to 6 was punched into a size of 17 mmϕ. The punched-out electrode and a negative electrode made of Li metal having a size of 17 mmϕ were disposed at both ends inside a 2032 type coin cell.

Aluminum electrolytic foil having a thickness of 20 μm was used as a current collector on the positive electrode side, and a stainless steel mesh was located on the current collector side.

Two separators (Celgard 3501) were inserted between the electrodes. Thus, a cell for a lithium ion battery was prepared.

The above electrolyte solution was poured into the cell, and the cell was sealed. The discharge capacity (mAh) was measured by the method below. The resulting value was divided by the weight of the active material, and the discharge capacity (mAh/g) per weight of the active material was evaluated.

The batteries that were manufactured for this evaluation were used as the evaluation batteries 1 to 11 and the comparison batteries 1 to 6.

[Manufacture of Lithium Ion Battery for Evaluating Negative Electrode]

The negative electrode prepared in any one of Examples 12 to 22 and Comparative Examples 7 to 11 was punched into a size of 17 mmϕ. The punched-out electrode and a positive electrode made of Li metal having a size of 17 mmϕ were disposed at both ends inside a 2032 type coin cell.

Copper foil having a thickness of 20 μm was used as a current collector on the negative electrode side and the aramid separator was located on the separator side (positive electrode side).

Two separators (Celgard 3501) were inserted between the electrodes. Thus, a cell for a lithium ion battery was prepared. The above electrolyte solution was poured into the cell, and the cell was sealed. The discharge capacity (mAh) was measured by the method below. The resulting value was divided by the weight of the active material, and the discharge capacity (mAh/g) per weight of the active material was evaluated.

The batteries that were manufactured for this evaluation were used as the evaluation batteries 12 to 22 and the comparison batteries 7 to 11.

<Evaluation of Rate Characteristics of Lithium Ion Battery>

Using a charge/discharge measuring apparatus "Battery analyzer Model 1470" [manufactured by TOYO Corporation], evaluation of the evaluation batteries 1 to 22 and the comparison batteries 1 to 11 was performed at room temperature according to the following method.

For the evaluation of the positive electrode, charging of each to 4.2 V was carried out at current of 0.1 C and 1.0 C, and from the battery capacity which is obtained by discharging of each to 2.7 V at 0.1 C and 1.0 C after resting for 10 minutes, the rate characteristics were calculated based on the following equation.

For the evaluation of the negative electrode, charging of each to 1.5 V was carried out at current of 0.1 C and 1.0 C, and from the battery capacity which is obtained by discharging of each to 10 mV at current of 0.1 C and 1.0 C after resting for 10 minutes, the rate characteristics (i.e., ratio between battery capacity at 0.1 C and battery capacity at 1.0 C) were calculated based on the following equation. Higher rate characteristics value indicates better battery characteristics due to smaller decrease incapacity. Because the rate characteristics also depend on the electrode thickness, in the present evaluation, the value obtained by multiplying with a calibrating coefficient $[0.5 \times (\text{electrode thickness } (\mu m))^{1.4}]$ based on a ratio between battery capacity at 0.1 C and battery capacity at 1.0 C is used as rate characteristics such that the comparison can be made also for electrodes with different thicknesses.

(Rate characteristics[%])=[Charge (or discharge) capacity at 1.0 C]÷[Charge (or Discharge) capacity at 0.1 C]×100×0.5×(Electrode thickness $(\mu m))^{1.4}$ The electrodes for a lithium ion battery according to each example are an electrode for a lithium ion battery with excellent electron conductivity even when the electrode thickness is increased. Thus, it was found that higher discharge capacity per weight of the active material was exhibited despite the increased electrode thickness. The electrode of the present invention can be used as an electrode for a lithium ion battery excellent in the discharge capacity per unit area.

INDUSTRIAL APPLICABILITY

The electrode for a lithium ion battery which is obtained according to the present invention is particularly useful as an electrode for, for example, bipolar secondary batteries and lithium ion secondary batteries for cellular phones, personal computers, hybrid automobiles, and electric vehicles.

REFERENCE SIGNS LIST

1 Lithium ion battery
10, 210 Electrode (positive electrode) for lithium ion battery
11, 211 First principal surface of positive electrode
12, 212 Second principal surface of positive electrode
13A Short fibers
13B Long fibers
14 Positive electrode active material particles
15, 25 Coating agent
16, 26 Conductive aid
20, 220 Electrode (negative electrode) for lithium ion battery
21, 221 First principal surface of negative electrode
22, 222 Second principal surface of negative electrode
24 Negative electrode active material particles
30 Separator
40, 50 Current collector
225 Slurry layer
470 Filter paper

The invention claimed is:

1. An electrode for a lithium ion battery provided with a first principal surface located on a separator side of the lithium ion battery and a second principal surface located on a current collector side, wherein
the electrode does not contain a binding agent,
the electrode has a thickness of 50 to 5000 μm,
the electrode comprises, between the first principal surface and the second principal surface, short fibers (A) having an average fiber length of 50 nm or more and less than 100 μm, long fibers (B) having an average fiber length of 100 μm or more and 1000 μm or less, and active material particles (C),
the active material particles (C) are coated active material particles whose surface is at least partially coated with a coating agent containing a coating resin and a conductive aid,
the coating resin is selected from the group consisting of vinyl resin containing methacrylic acid as a monomer component, vinyl resin containing methyl methacrylate as a monomer component, vinyl resin containing 2-ethylhexyl methacrylate as a monomer component, urethane resin, polyester resin, polyamide resin, polyimide resin, silicone resin, melamine resin, urea resin, aniline resin, ionomer resin, or polycarbonate,
the short fibers (A) and the long fibers (B) are electroconductive fibers, and
an average fiber diameter of the long fibers (B) is 0.1 to 100 μm.

2. The electrode for a lithium ion battery according to claim 1, wherein
the short fibers (A) are electroconductive fibers which are scatteredly present between the first principal surface and the second principal surface, and
electrical conductivity of the short fibers (A) is 50 mS/cm or more.

3. The electrode for a lithium ion battery according to claim 1, wherein an average fiber diameter of the short fibers (A) is 0.01 to 20 μm.

4. The electrode for a lithium ion battery according to claim 1, wherein
the long fibers (B) are electroconductive fibers which are scatteredly present between the first principal surface and the second principal surface, and
electrical conductivity of the long fibers (B) is 50 mS/cm or more.

5. The electrode for a lithium ion battery according to claim 1, wherein, based on a volume of the electrode, volume proportion of the short fibers (A) is 0.1 to 15% by volume and volume proportion of the long fibers (B) is 0.001 to 15% by volume.

6. The electrode for a lithium ion battery according to claim 1, wherein a ratio $(V_A/V_B)$ of a volume $(V_A)$ of the short fibers (A) to a volume $(V_B)$ of the long fibers (B) is 0.2 to 50.

7. The electrode for a lithium ion battery according to claim 1, wherein, based on a volume of the electrode, volume proportion of the active material particles (C) is 30 to 80% by volume.

8. A lithium ion battery in which the electrode for a lithium ion battery set forth in claim 1 is used as a negative electrode and/or a positive electrode.

9. A method for producing the electrode for a lithium ion battery set forth in claim 1, comprising:
a first step (Q1) of applying a slurry (Y) containing the short fibers (A), the long fibers (B), and the active material particles (C) onto a film (E); and
a second step (Q2) of performing pressurization or depressurization and fixing the active material particles (C), the short fibers (A), and the long fibers (B) onto the film (E).

10. The method for producing the electrode for a lithium ion battery according to claim 9, wherein
the slurry (Y) is an electrolyte solution slurry (Y1) containing an electrolyte solution (D),
the film (E) is a film impermeable to the active material particles (C) but permeable to the electrolyte solution (D), and
the electrolyte solution (D) is allowed to permeate the film (E) by pressurization or depressurization so as to be removed in the second step (Q2).

11. The method for producing the electrode for a lithium ion battery according to claim 9, wherein a press step (Q3) of pressurizing the slurry (Y) at a higher pressure is performed after the second step (Q2).

12. The method for producing the electrode for a lithium ion battery according to claim 9, wherein electrical conductivity of the film (E) is 100 mS/cm or more.

13. The method for producing the electrode for a lithium ion battery according to claim 9, wherein a step (Q4) of transferring the electrode for a lithium ion battery fixed onto the film (E) to a principal surface of a current collector or a separator is performed so as to form an electrode for a lithium ion battery having a first principal surface thereof on a principal surface of the separator or form an electrode for a lithium ion battery having a second principal surface thereof on a principal surface of the current collector.

14. A method for producing the electrode for a lithium ion battery set forth in claim 1, comprising:
step (T1) of applying a slurry (Y) containing the short fibers (A), the long fibers (B), and the active material particles (C) onto a current collector to form a slurry layer on the current collector; and
step (T2) of disposing a separator onto the slurry layer and absorbing liquid from an upper surface of the separator so as to fix the active material particles (C), the short fibers (A), and the long fibers (B) between the current collector and the separator.

15. The method for producing the electrode for a lithium ion battery according to claim 14, wherein the slurry (Y) is an electrolyte solution slurry (Y1) containing an electrolyte solution (D).

16. The method for producing the electrode for a lithium ion battery according to claim 14, wherein the liquid absorption is performed from an upper surface of the separator by disposing a liquid-absorbing material on the upper surface of the separator.

17. The electrode for a lithium ion battery according to claim 1, wherein the coating resin is selected from the group consisting of vinyl resin containing methacrylic acid as a monomer component, vinyl resin containing methyl methacrylate as a monomer component, vinyl resin containing 2-ethylhexyl methacrylate as a monomer component, urethane resin, polyimide resin, silicone resin, melamine resin, aniline resin, ionomer resin, or polycarbonate.

18. An electrode for a lithium ion battery provided with a first principal surface located on a separator side of the lithium ion battery and a second principal surface located on a current collector side, wherein
the electrode does not contain a binding agent,
the electrode has a thickness of 50 to 5000 µm,
the electrode comprises, between the first principal surface and the second principal surface, short fibers (A) having an average fiber length of 50 nm or more and less than 100 µm, long fibers (B) having an average fiber length of 100 µm or more and 1000 µm or less, and active material particles (C) while a binding agent is not included therein,
the active material particles (C) are coated active material particles whose surface is at least partially coated with a coating agent containing a coating resin and a conductive aid,
the coating resin is selected from the group consisting of vinyl resin containing methacrylic acid as a monomer component, vinyl resin containing methyl methacrylate as a monomer component, vinyl resin containing 2-ethylhexyl methacrylate as a monomer component, urethane resin, polyester resin, polyamide resin, polyimide resin, silicone resin, melamine resin, urea resin, aniline resin, ionomer resin, or polycarbonate, and
the short fibers (A) and the long fibers (B) are electroconductive fibers.

19. The electrode for a lithium ion battery according to claim 18, wherein an average fiber diameter of the long fibers (B) is 0.1 to 100 µm.

20. An electrode for a lithium ion battery provided with a first principal surface located on a separator side of the lithium ion battery and a second principal surface located on a current collector side, wherein
the electrode does not contain a binding agent,
the electrode has a thickness of 50 to 5000 µm,
the electrode comprises, between the first principal surface and the second principal surface, short fibers (A) having an average fiber length of 50 nm or more and less than 100 µm, long fibers (B) having an average fiber length of 100 µm or more and 1000 µm or less, and active material particles (C),
the active material particles (C) are coated active material particles whose surface is at least partially coated with a coating agent containing a coating resin and a conductive aid,
the coating resin is selected from the group consisting of vinyl resin containing methacrylic acid as a monomer component, vinyl resin containing methyl methacrylate as a monomer component, vinyl resin containing 2-ethylhexyl methacrylate as a monomer component, urethane resin, polyester resin, polyamide resin, polyimide resin, silicone resin, melamine resin, urea resin, aniline resin, ionomer resin, or polycarbonate,
the short fibers (A) and the long fibers (B) are electroconductive fibers, and an average fiber diameter of the long fibers (B) is larger than an average fiber diameter of the short fibers (A).

* * * * *